April 10, 1956  F. J. KAESS  2,741,330
APPARATUS FOR THE REMOVAL OF SOLID MATTER FROM GASES
Filed Nov. 12, 1953
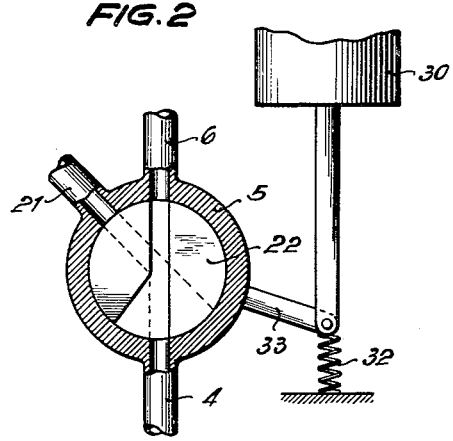
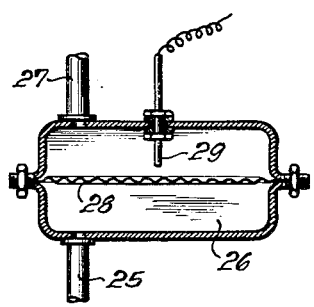
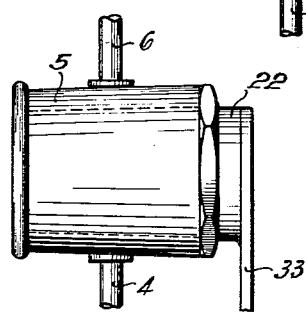
INVENTOR
FRANZ KAESS United States Patent Office 2,741,330
Patented Apr. 10, 1956

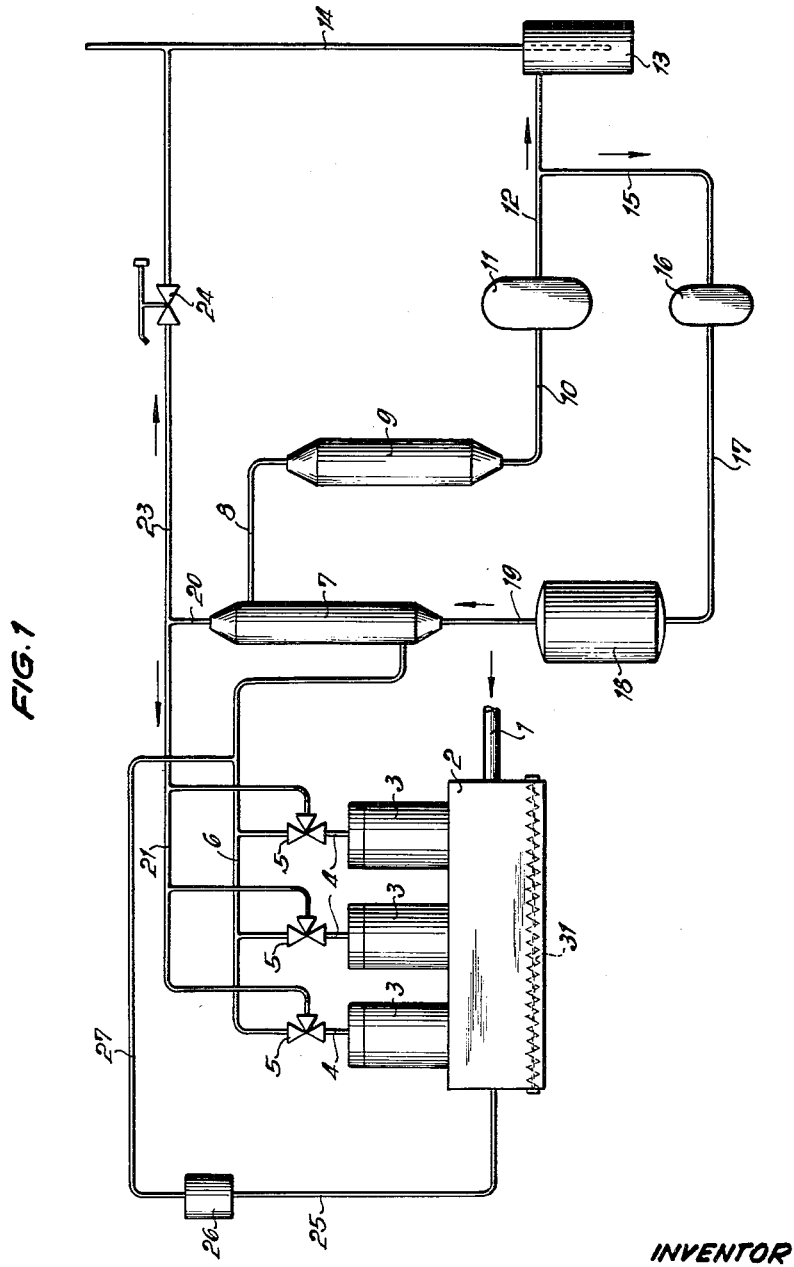

2,741,330

APPARATUS FOR THE REMOVAL OF SOLID MATTER FROM GASES

Franz Josef Kaess, Trostberg, Germany, assignor to Suddeutsche Kalkstickstoffwerke Aktiengesellschaft, Trostberg, Germany Application November 12, 1953, Serial No. 391,603

6 Claims. (Cl. 183—57)

This invention relates to an apparatus for the removal of solid matter from gases.

The purification of gases is generally carried out either electrostatically or by means of filters of various materials or in a wet process by means of disintegrators or similar apparatus. The electrostatic purification requires an expensive installation and high operating cost and furnishes a gas which still contains traces of mechanical impurities. The purification with filter fabrics has to be carried out at temperatures below 100° C., as otherwise the material of the filter is too strongly attacked. A purification of hot gases in this way is not possible.

The removal of suspended matter by scrubbing the gases in suitable apparatus (disintegrators) requires a large source of supply of water and extensive clarification plants for working up the wash water.

In order to overcome the drawbacks of the recited methods, the purification of hot gases by means of refractory filter bodies has been used. However, this method has the disadvantage that the pores of the filter bodies soon become clogged and are difficult to regenerate.

It is a principal object of the invention to provide an apparatus for removing solids from hot gases by means of refractory filter bodies, where a clogging of the pores of the filter bodies is avoided.

Another object of the invention is to provide an apparatus in which solids are removed from gases by means of refractory filter bodies, which apparatus can be used for prolonged periods of time without necessitating interruption of the purifying operation for regenerating the activity of the filter bodies.

Other objects and advantages will become apparent from a consideration of the specification and claims.

The new purification method consists in periodically sweeping clean the pores of the filter bodies by intermittently recycling purified gases in the reverse direction through the filter bodies to dislodge the dust collected in the pores, and to control the recycling of the gases and the cleaning in accordance with the pressure drop therein, which depends on the height of the collected dust layer and the size of the collected dust particles.

The invention will be better understood on consideration of the accompanying drawings, which show by way of example diagrammatically an installation suitable for carrying out the new purification process, and details of the apparatus.

In the drawings:

Fig. 1 is a diagram of an installation operated according to the method of the invention;

Fig. 2 is a sectional view of a valve for regulating the gas flow;

Fig. 3 is a cross sectional view of a manometer operated by the pressure difference; and Fig. 4 is a side view of the valve of Fig. 2.

As shown in Fig. 1, crude gases flow through a pipe 1 into a chamber 2, with which the filter bodies 3 are associated. The gases pass through the walls of the filter bodies, made of a refractory material, and continue dust-free through the ducts 4 into the three-way valves 5, hence through pipes 6, a heat exchanger 7, pipe 8, cooler 9, pipe 10 to a blower or pump 11, which applies suction to the gases in the pipe 1. From the blower 11, the gases pass through a pipe 12 into a water seal 13, and then flow through the pipe 14 to the place of consumption. A duct 15 branches from the pipe 12 and passes a portion of the purified gas over a fan 16 and a pipe 17 into a pressure vessel 18. From this pressure vessel 18, the gases travel through a pipe 19 into the heat exchanger 7 and hence through the pipes 20 and 21 to the valves 5. In the housing of the valves 5 are plugs 22, which, according to their position allow passage of the gases from 4 to 6 or from 21 to 4. A pipe 23 with regulating valve 24 connects the pipe 20 with pipe 14 for releasing the pressure in the pressure vessel 18.

The chamber 2 is connected through the duct 25 with one side of a pressure differential manometer 26 (Fig. 3), the other side of which is connected through the duct 27 with pipe 6. The manometer is partitioned by an electrically conductive membrane 28. A contact pin 29 inside the manometer is connected with an electromagnet 30 connected to one terminal of a source of electric current, the other terminal of which is connected to the membrane 28. Either the contact pin 29 or the membrane 28 must be insulated against the housing of the manometer 26.

The filter bodies 3 are preferably cylinders, which are closed at one end and consist of gas permeable refractory materials; suitable substances are ceramics, such as clay, porcelain, molten or sintered alumina, also carbon, coke, and carbonaceous materials, silicon carbide, sintered metals, or mixtures of ceramics with suitable powdered metals (ceramets). When binders are used for the preparation of the filter bodies, they must of course also be resistant to high temperatures.

The apparatus operates as follows:

A raw gas of varying composition, e. g. containing 50 to 90 per cent of carbon monoxide, 5 to 15 per cent of hydrogen, 3 to 7 per cent of carbon dioxide, 0 to 0.5 per cent of oxygen, the balance being nitrogen, and carrying dust in an amount of 40 to 120 g./m.$^3$, is withdrawn by means of the aspirator 11 from a furnace, and passed through the duct 1, the chamber 2, the filter bodies 3, the pipes 6, 8, 10, so as to be fed in the purified state through the pipe 14 to the place of consumption. The filter bodies consist of porous refractory cylinders, which are closed at one end. The raw gas enters into said cylinders preferably from the outside toward the inside and passes purified into the pipe 6; in this way, the solids are deposited on the outer face of the cylinders. Part of the purified gas flows through the pipe 15 and the fan 16 and is passed under pressure into the pressure vessel 18 and stored therein. The pressure vessel has a volume of about 2 m.$^3$ and stores at a pressure of about 1.2 atm. When this pressure has been reached, the gas escapes through the control valve 24 in the exit pipe 14. By proper adjustment of the blower 11, a constant underpressure of about 10 to 15 mm. H$_2$O is maintained in the chamber 2. The more solids are deposited on the cylinders of the filter bodies, the less becomes the pressure behind the filter, so that an increasing pressure difference develops between the chamber 2 at one side and the pipe 6 at the other side. The contact pin 29 (Fig. 3) can be so adjusted that the automatic reversal to back sweeping may be started within a pressure difference range of 20 to 700 mm. $H_2O$ at both sides of the membrane 28. The pressure difference produces a displacement of the manometer membrane 28 (Fig. 3) in the direction of the contact pin 29 until contact is made.

By the closing of the contact, the electromagnets 30 are excited and turn the cocks 22 (Fig. 2) by means of the levers 33 into the position shown in dotted lines; as a result, purified gas from the pressure vessel 18 passes through the duct 19, the heat exchanger 7 and the duct 21 in opposite direction through the filter bodies 3 into the chamber 2 and dislodges the solids attached to the outside of the filter bodies. The solids fall into the chamber 2 and are removed by the worm conveyor 31, shown in dotted lines.

After the gas stored in the pressure vessel 18 has been used up, and the solids have been dislodged from the outer walls of the filter bodies, the pressure is substantially equalized, so that the contact between 28 and 29 is broken and the cocks 22 are returned by the action of springs 32 into the position shown in solid lines, whereupon crude gas is passed again from the duct 1 through the filter bodies.

The purified gas contains solids in an amount of less than 5 mg./m.$^3$. The heating up of the scavenging gas in the heat exchanger 7 has the purpose of preventing condensation in the filter bodies 3.

*Example*

The described installation was used for the purification of a carbide oven gas of the following composition:

|  | Percent |
|---|---|
| CO | 65 |
| $H_2$ | 10 |
| $CO_2$ | 5 |
| $N_2$ | 20 |

The gas had a dust content of 110 g./m.$^3$ (at 0° C. and 760 mm. pressure) and was removed from the oven at a rate of about 500 m.$^3$ per hour with a temperature of about 300° C. The suction pressure in front of the filter was about −15 mm. water. The filter installation proper had a size of 350 x 120 x 200 cm.

For the recited input a filter surface of 30 m.$^2$ was necessary to obtain a dust-free gas, i. e. a gas which showed no positive dust reaction with the Bewag-Rosenmüller device. The pressure behind the filter was 300 mm. $H_2O$, in front of the aspirator 600 mm. $H_2O$. The membrane 28 of the control manometer was so adjusted as to automatically reverse the direction of the gases for sweeping at a pressure difference of 400 mm. $H_2O$.

From the foregoing, it is thought that the construction and operation of the apparatus will be readily understood and further explanation of the same is believed to be unnecessary. By using a completely automatic pressure drop responsive reverse sweep of the purified gases, the porosity of the refractory filters and the excellent filtering power of such filters is maintained for continuous operation. The solids are removed in the dry state, and water supply is needed only for cooling.

It is evident that the principles of the invention may be realized and carried out by a variety of structures and may be utilized in various embodiments, and accordingly it is not desired to limit the invention to the exact embodiment shown and described but all suitable modifications and equivalents may be resorted to, falling within the scope of the appended claims.

I claim:
1. A self-cleaning filtering apparatus for removing solids from gases comprising a refractory filter body, a conduit for feeding gas to said filter body, an outlet conduit for the purified gas leaving said filter body, said outlet conduit comprising a first and a second section, valve means in said outlet pipe connecting said first and second section, a vessel for storing part of said purified gas; a conduit connecting said storage vessel with said valve means, a pressure differential manometer, one side of which communicates with the gas space in front of said filter body and the other side of which communicates with the gas space behind said filter body, a contact controlled by said manometer, and electromagnets controlled by said contact and actuating said valve means, which valve means in one position connect the two sections of the outlet conduit and in another position connect the first section of the outlet conduit with the conduit to said storage vessel.

2. An apparatus as defined in claim 1 wherein the pressure differential manometer comprises a housing, an electrically conductive membrane partitioning said housing into two compartments, and an adjustable contact pin electrically insulated from said membrane and contacted by the same at a predetermined pressure difference in said two compartments.

3. A self-cleaning filtering apparatus for removing solids from gases comprising refractory filter bodies, a conduit feeding dust containing gases to said filter bodies, an outlet conduit for the purified gases leaving said filter bodies, a three-way valve in said outlet conduit allowing in its normal position free passage of the purified gases through said conduit, a gas storage vessel, means to pump gases from said outlet circuit into said vessel, a sweep circuit branching off from said outlet circuit behind said three-way valve in the direction of flow of the purified gases and leading through said pumping means into said storage vessel and connecting said storage vessel with said three-way valve, a manometer circuit connecting the gas feed in front of said filter bodies with said outlet conduit, pressure responsive means in said manometer circuit, an electromagnet actuating said three-way valve, an electric circuit connecting said pressure responsive means and said electromagnet, a contact in said electric circuit closed by said pressure responsive means at a predetermined pressure differential in said manometer circuit and opened when the pressure along said circuit has been substantially equalized, the closing of said electric circuit exciting said electromagnet and causing the same to turn the three-way valve in the position connecting the sweep circuit with the filter bodies, and means to return the three-way valve into its normal position on opening of said electric circuit.

4. An apparatus as defined in claim 3 wherein the pressure responsive means comprise a housing, an electrically conductive membrane partitioning said housing into two compartments communicating with the gas feed for the filter bodies, the other compartment communicating with the said outlet conduit, and a contact pin in said housing insulated from said membrane, said membrane contacting said contact pin at a predetermined pressure differential between said two compartments.

5. An apparatus as defined in claim 3, including a heat exchanger passed by the outlet conduit and by the connection of the storage vessel with the three-way valve.

6. A self-cleaning filtering apparatus for removing solids from hot oven gases comprising a refractory filter body, a duct feeding dust-containing hot oven gas to said filter body, an outlet duct for the hot purified gas leaving said filter body, a storage vessel, means for forcing part of said purified gas into said storage vessel under pressure, a return conduit for said stored purified gas to said filter body, said return conduit being arranged in heat exchange with said outlet duct so as to heat up gas returned to the filter body by hot purified gas coming from said filter body, valve means in said return conduit normally closing the same, a differential manometer communicating with said feed duct and said outlet duct, means controlling said valve means, said valve controlling means being actuated by said differential manometer at predetermined pressure differentials between said ducts to open said return conduit, thereby causing said stored gas to be forced through said filter body in reverse direction.

References Cited in the file of this patent

UNITED STATES PATENTS

| | | |
|---|---|---|
| 1,784,278 | Dollinger | Dec. 9, 1930 |
| 2,368,787 | Skinner | Feb. 6, 1945 |
| 2,429,751 | Gohr et al. | Oct. 28, 1947 |
| 2,500,851 | Miller | Mar. 14, 1950 |
| 2,526,651 | Garbo | Oct. 24, 1950 |

FOREIGN PATENTS

| | | |
|---|---|---|
| 279,424 | Germany | Oct. 17, 1914 |
| 344,227 | Great Britain | Mar. 5, 1931 |